US011980883B2

(12) United States Patent
Strong et al.

(10) Patent No.: US 11,980,883 B2
(45) Date of Patent: May 14, 2024

(54) LATERAL FLOW PUMP HOUSING

(71) Applicant: BIO-RAD LABORATORIES, INC., Hercules, CA (US)

(72) Inventors: William Strong, El Cerrito, CA (US); Daniel Y. Chu, San Francisco, CA (US)

(73) Assignee: BIO-RAD LABORATORIES, INC., Hercules, CA (US)

( * ) Notice: Subject to any disclaimer, the term of this patent is extended or adjusted under 35 U.S.C. 154(b) by 124 days.

(21) Appl. No.: 16/641,676

(22) PCT Filed: Aug. 22, 2018

(86) PCT No.: PCT/US2018/047405
§ 371 (c)(1),
(2) Date: Feb. 25, 2020

(87) PCT Pub. No.: WO2019/040544
PCT Pub. Date: Feb. 28, 2019

(65) Prior Publication Data

US 2020/0384461 A1 Dec. 10, 2020

Related U.S. Application Data

(60) Provisional application No. 62/550,105, filed on Aug. 25, 2017.

(51) Int. Cl.
*B01L 9/00* (2006.01)
*B01L 3/00* (2006.01)

(52) U.S. Cl.
CPC ......... *B01L 3/5023* (2013.01); *B01L 2200/12* (2013.01); *B01L 2300/0609* (2013.01); *B01L 2300/0825* (2013.01); *B01L 2400/0406* (2013.01)

(58) Field of Classification Search
CPC ............... B01L 3/5023; B01L 2200/12; B01L 2300/0609; B01L 2300/0825; B01L 2400/0406; B01L 2400/0481; B01L 3/50273; B01L 2200/025; B01L 9/52
See application file for complete search history.

(56) References Cited

U.S. PATENT DOCUMENTS 4,981,785 A 1/1991 Nayak
5,435,970 A 7/1995 Mamenta et al.
5,744,096 A 4/1998 Jones et al.
5,914,273 A 6/1999 Kok
(Continued)

FOREIGN PATENT DOCUMENTS

CN 1646909 7/2007
CN 107036847 8/2017
(Continued)

OTHER PUBLICATIONS

Extended European Search Report for EPO Application No. 18848746.6, dated Feb. 26, 2021, pp. 1-7.
(Continued)

*Primary Examiner* — Matthew D Krcha
*Assistant Examiner* — Sophia Y Lyle
(74) *Attorney, Agent, or Firm* — SALIWANCHIK, LLOYD & EISENSCHENK

(57) ABSTRACT

Lateral flow device pump housings and methods of making such housings are provided.

10 Claims, 10 Drawing Sheets

(56) References Cited

U.S. PATENT DOCUMENTS

| | | | | |
|---|---|---|---|---|
| 6,276,220 | B1 * | 8/2001 | Varhol | G01N 1/12 73/863.73 |
| 6,436,722 | B1 | 8/2002 | Clark et al. | |
| 7,238,519 | B2 | 7/2007 | Bellet et al. | |
| 8,501,495 | B2 | 8/2013 | Yao et al. | |
| 9,702,872 | B1 | 7/2017 | Wang et al. | |
| 2003/0021727 | A1 * | 1/2003 | Weyker | A61B 10/007 436/169 |
| 2004/0082878 | A1 | 4/2004 | Baldwin et al. | |
| 2004/0115832 | A1 * | 6/2004 | Shareef | B01L 3/5023 436/514 |
| 2007/0128070 | A1 | 6/2007 | Wu et al. | |
| 2009/0030342 | A1 * | 1/2009 | Flanigan | B01L 3/5029 600/572 |
| 2009/0226883 | A1 | 9/2009 | Wu et al. | |
| 2010/0226822 | A1 | 9/2010 | Ramel et al. | |
| 2010/0323369 | A1 * | 12/2010 | Marlborough | G01N 33/54306 435/7.1 |
| 2011/0189792 | A1 * | 8/2011 | Reinhartz | G01N 33/54386 436/501 |
| 2011/0212453 | A1 * | 9/2011 | Agarwal | B01L 3/52 435/6.12 |
| 2012/0328488 | A1 | 12/2012 | Puntambekar et al. | |
| 2013/0040286 | A1 * | 2/2013 | Chan | G01N 33/5302 435/5 |
| 2013/0164193 | A1 * | 6/2013 | Semenov | G01N 1/28 422/507 |
| 2013/0344581 | A1 * | 12/2013 | Nicholls | G01N 21/64 422/82.08 |
| 2014/0220606 | A1 | 8/2014 | Puntambekar et al. | |
| 2014/0220626 | A1 | 8/2014 | Kumada et al. | |
| 2015/0338387 | A1 | 11/2015 | Ehrenkranz | |
| 2016/0291009 | A1 | 10/2016 | Kim et al. | |
| 2017/0191997 | A1 | 7/2017 | McKee et al. | |
| 2018/0141040 | A1 | 5/2018 | Strong et al. | |
| 2019/0203599 | A1 * | 7/2019 | Sun | G01M 5/0041 |
| 2020/0116598 | A1 | 4/2020 | Ling | |

FOREIGN PATENT DOCUMENTS

| | | | | |
|---|---|---|---|---|
| WO | WO-9404425 | A1 * | 3/1994 | B01L 3/50825 |
| WO | WO-2004011132 | A2 * | 2/2004 | B01L 3/00 |
| WO | 2011014673 | A1 | 2/2011 | |

OTHER PUBLICATIONS

Written Opinion in International Application No. PCT/US2018/047405, dated Nov. 1, 2018, pp. 1-9.

* cited by examiner

LATERAL FLOW PUMP HOUSING

CROSS-REFERENCE TO RELATED APPLICATIONS

This application is the U.S. national stage application of International Patent Application No. PCT/US2018/047405, filed Aug. 22, 2018, which claims the benefit of U.S. Provisional Patent Application No. 62/550,105, filed Aug. 25, 2017.

BACKGROUND

Lateral flow immunoassays are inexpensive tests that are commonly used to detect the presence or absence of an analyte in a sample. In a typical test strip-based lateral flow immunoassay, a sample is added to a sample application pad and then flows by capillary action to a conjugate release pad, into which the detection reagent has been dried. The sample then migrates along a nitrocellulose membrane, upon which antibodies have been immobilized as a test line and a control line. A signal at the test line is indicative of a positive result, while a signal at the control line demonstrates that the lateral flow immunoassay is performing correctly. An absorbent pad (or "pump") at the end of the test strip draws or wicks liquid through the test strip and prevents backflow of liquid.

SUMMARY

Provided herein are lateral flow pump housings and methods of making such housings.

In an embodiment, a lateral flow pump housing comprises a base comprising a cavity for housing a pump, the pump comprising a compressed absorbent pad in contact with an end of a wicking pad; and a cup nested inside the cavity, wherein a cup side wall is attached to a pump housing side wall in the base. In some embodiments, the cup exerts a force per unit area or pressure of at least about 1000 Newtons per square meter. In other embodiments, the cup exerts a force per unit area or pressure of between at least about 1000 Newtons per square meter and about 11,000 Newtons per square meter on the pump. In certain embodiments the cup exerts a force of between about 1800 Newtons per square meter and about 5000 Newtons per square meter or between about 2200 Newtons per square meter and about 4400 Newtons per square meter on the pump. In yet other embodiments, the cup exerts: about 1800 Newtons per square meter; about 2200 Newtons per square meter; or about 4400 Newtons per square meter on the pump. In certain embodiments, the cup side wall comprises a first set of ratchet teeth complementary to a second set of ratchet teeth in the pump housing side wall.

In some embodiments, a bottom surface of the cup and/or the pump housing comprises a rib. In some embodiments, the rib is parallel to the longest dimension of the bottom surface of the cup and/or the pump housing. In certain embodiments, the cup comprises a length and a width substantially the same as a respective length and width of the pump.

In an embodiment, the lateral flow device pump housing comprises a base comprising a region for placing a pump, the pump comprising a compressed absorbent pad in contact with an end of a wicking pad; and a pump cover, wherein the cover is attached to the base with spring loaded hooks. In some embodiments, the cover exerts a force per unit area or a pressure of at least about 1000 Newtons per square meter on the pump. Alternatively, the cover exerts a force or a pressure of between at least about 1000 Newtons per square meter and about 11,000 Newtons per square meter on the pump. In certain embodiments the force applied by the cover on the pump may be between about 1800 Newtons per square meter and about 5000 Newtons per square meter or between about 2200 Newtons per square meter and about 4400 Newtons per square meter. In yet other embodiments, the cover exerts: about 1800 Newtons per square meter; about 2200 Newtons per square meter; or about 4400 Newtons per square meter on the pump. In some cases, the region for placing the pump is a cavity and the cover is flat. In some cases, the region for placing the pump is flat and the pump cover comprises a cavity for housing the pump. In some embodiments, the cover further comprises a retaining wall for retaining the pump. In certain embodiments, the cover further comprises two parallel retaining walls running perpendicular to the lateral edges of the lateral flow device.

In some embodiments, the cup, cover and/or the base are formed from at least one plastic selected from the group consisting of polyethylene terephthalate, polyethylene terephthalate glycol modified, polypropylene, polystyrene, polyvinyl chloride, acrylic, polyester, and polycarbonate. In certain embodiments, at least a part of the wicking pad is bonded to the base. In some cases, the wicking pad and the pump are formed of at least one absorbent material selected from the group consisting of glass fiber, cotton, cellulose, a cellulose fiber derivative, sintered glass, sintered polymer, sintered metal, and a synthetic polymer. In some embodiments, the absorbant pad is a plurality of absorbant pads.

In some embodiments, a lateral flow device comprises a housing as described above and elsewhere herein.

In an embodiment, a method of making a lateral flow pump housing comprises providing a pump, a base comprising a cavity for housing the pump, and a cup nested inside the cavity, wherein the pump comprises a compressible absorbent pad in contact with an end of a wicking pad; and attaching a cup side wall to a pump housing side wall in the base while applying a force per unit area or a pressure to the pump with the cup, thereby compressing the pump with the cup. In some embodiments, the cup side wall is attached to the pump housing side wall by heat welding, adhesive bonding, solvent bonding, ultrasonication, or laser welding. In some cases, the cup side wall is attached to the pump housing side wall with rivets or screws. In certain embodiments, the cup side wall is attached to the pump housing side wall by a complementary ratchet-like feature molded into the cup side wall and the pump housing side wall.

In some embodiments, a method of making a lateral flow pump housing comprises providing a pump, a base comprising a region for placing the pump, and a pump cover, wherein the pump comprises a compressible absorbent pad in contact with an end of a wicking pad; and attaching spring loaded hooks in the cover to the base while applying a force per unit area or a pressure to the pump with the cover, thereby compressing the pump with the cover.

In some embodiments, the method comprises applying a pressure of at least about 1000 Newtons per square meter to the pump with the cup or cover. Alternatively, method comprises applying a pressure of between about 1000 Newtons per square meter and about 11,000 Newtons per square meter on the pump with the cup or the cover. In certain other embodiments, the pressure applied by the cover or the cup in the disclosed method may be between about 1800 Newtons per square meter and about 5000 Newtons per square meter or between about 2200 Newtons per square meter and about 4400 Newtons per square meter. In yet other embodiments, the method comprises exerting a pressure of: about 1800 Newtons per square meter; about 2200 Newtons per square meter; or about 4400 Newtons per square meter on the pump with the cup or the cover.

BRIEF DESCRIPTION OF THE DRAWINGS

FIGS. 3A-3C are exploded views and FIG. 3D is an end view.

FIGS. 5A-5B are exploded views and FIG. 5C is an end view.

DETAILED DESCRIPTION

Figure 1B:
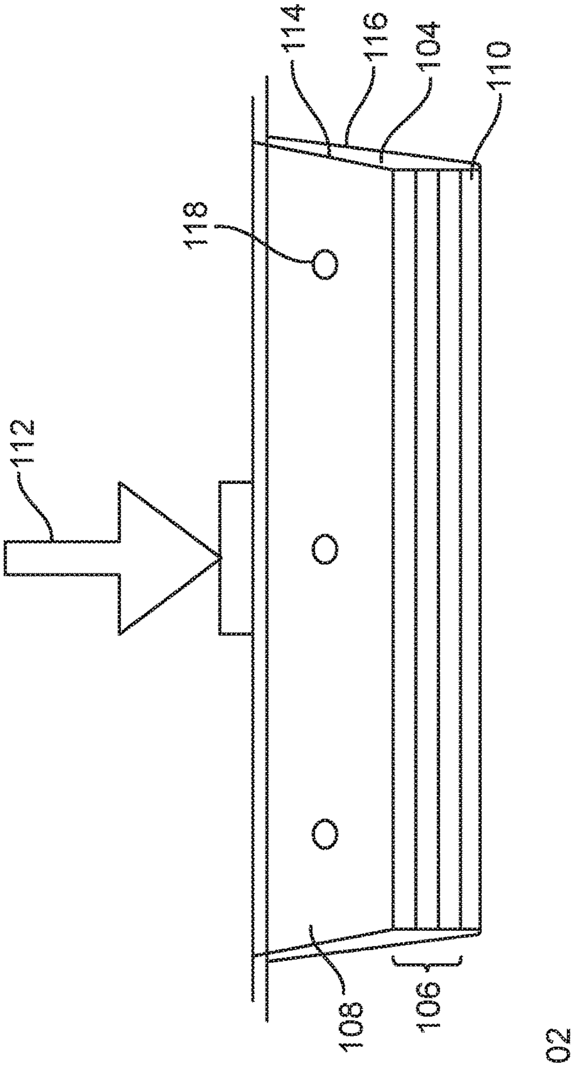
FIGS. 1A-1B are schematic top and end views of a lateral flow pump housing according to an embodiment of the invention.
Figure 1A:
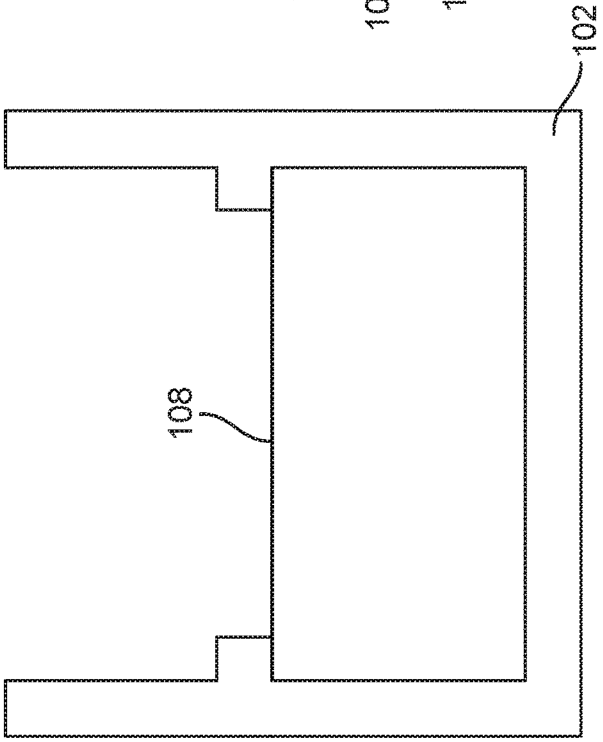

Described herein are lateral flow pump housings and methods for making such housings. Pump housings and methods of making such housing have been discovered in which a cup or pump cover attached to the pump housing applies a downward force to the pump (i.e., the cup or cover compresses the pump). Placing a downward force on the pump facilitates the flow of solutions through the wicking pad and into the pump, resulting in consistent lateral flow of solutions through the lateral flow device. The resultant pump housing can be used, for example, in a lateral flow device for detecting analytes (e.g., proteins, nucleic acids) immobilized on a substrate (e.g., a western blotting membrane). An example of such a lateral flow device is described in U.S. Provisional Patent Application 62/425,839 filed on Nov. 23, 2016 which is incorporated by reference in its entirety herein.

As used in this specification and the appended claims, the singular forms “a”, “an”, and “the” include plural referents unless the content clearly dictates otherwise. As used herein, the term “about” refers to the recited number and any value within 10% of the recited number. Thus, “about 5” refers to any value between 4.5 and 5.5, including 4.5 and 5.5.

I. Devices

FIGS. 1A-5C illustrate embodiments of a pump housing for a lateral flow device 100, 200, 300.

Referring to FIGS. 1A-2B, in an embodiment, the pump housing comprises a base 102 comprising a cavity 104 for housing a pump 106 and a cup 108 nested inside the cavity 104. The pump comprises one or more compressible absorbent pads in contact with an end of a wicking pad 110. The pump wicks lateral flow solution(s) from reservoir(s) in fluid communication with the opposite end of the wicking pad such that the solutions flow into the wicking pad and contact substances immobilized on a substrate (e.g., a western blotting membrane) in intimate contact with the wicking pad 110.

The cup 108 is attached to the pump housing and exerts a downward force 112 on (or compresses) the pump 106. In some embodiments, the force per unit area (or pressure) exerted by the cup on the pump is at least 1000 Newtons per square meter. Alternatively, the force per unit area (or pressure) exerted by the cup on the pump can be between about 1000 Newtons per square meter and about 11,000 Newtons per square meter on the pump. In certain embodiments the force may be between about 1800 Newtons per square meter and about 5000 Newtons per square meter or between about 2200 Newtons per square meter and about 4400 Newtons per square meter. In yet other embodiments, the cup exerts: about 1800 Newtons per square meter; about 2200 Newtons per square meter; or about 4400 Newtons per square meter on the pump. In an embodiment, a cup side wall 114 is attached to a pump housing side wall 116 in the base. In some embodiments, the cup side wall is attached to the pump housing side wall by a heat weld 118 (FIGS. 1B and 2B), an adhesive, a solvent bond, ultrasonication, or laser weld. In some embodiments, the cup side wall is attached to the pump housing side wall with rivets or screws. In some embodiments, the cup is attached to the pump housing by a ratchet system. For example, in some embodiments, the cup side wall comprises a first set of ratchet teeth complementary to a second set of ratchet teeth in the pump housing side wall.

Figure 6:
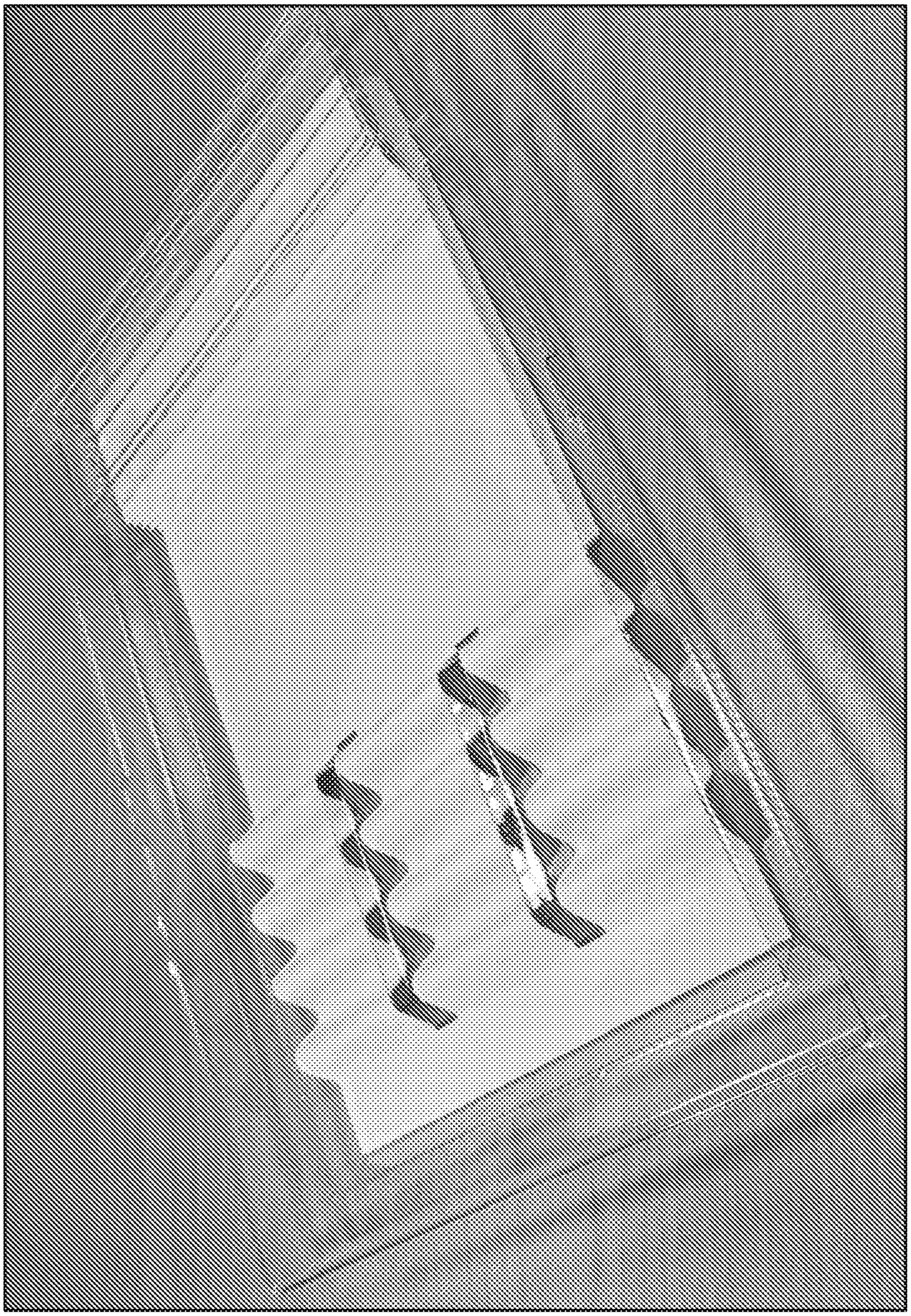
FIG. 6 is a perspective view of a lateral flow device according to an embodiment having multiple sets of reservoirs such that multiple substrates can be analyzed at one time. The device is also shown with a pump in intimate contact with the wicking pad downstream from the substrates.

In an embodiment in which more than one substrate with immobilized analytes is processed in the device and the device has multiple sets of reservoirs, the pump housing can house one pump (FIG. 6) or more than one pump each with a cup exerting a downward force thereon. The cup can be attached to the side wall of the pump housing.

Figure 2A:
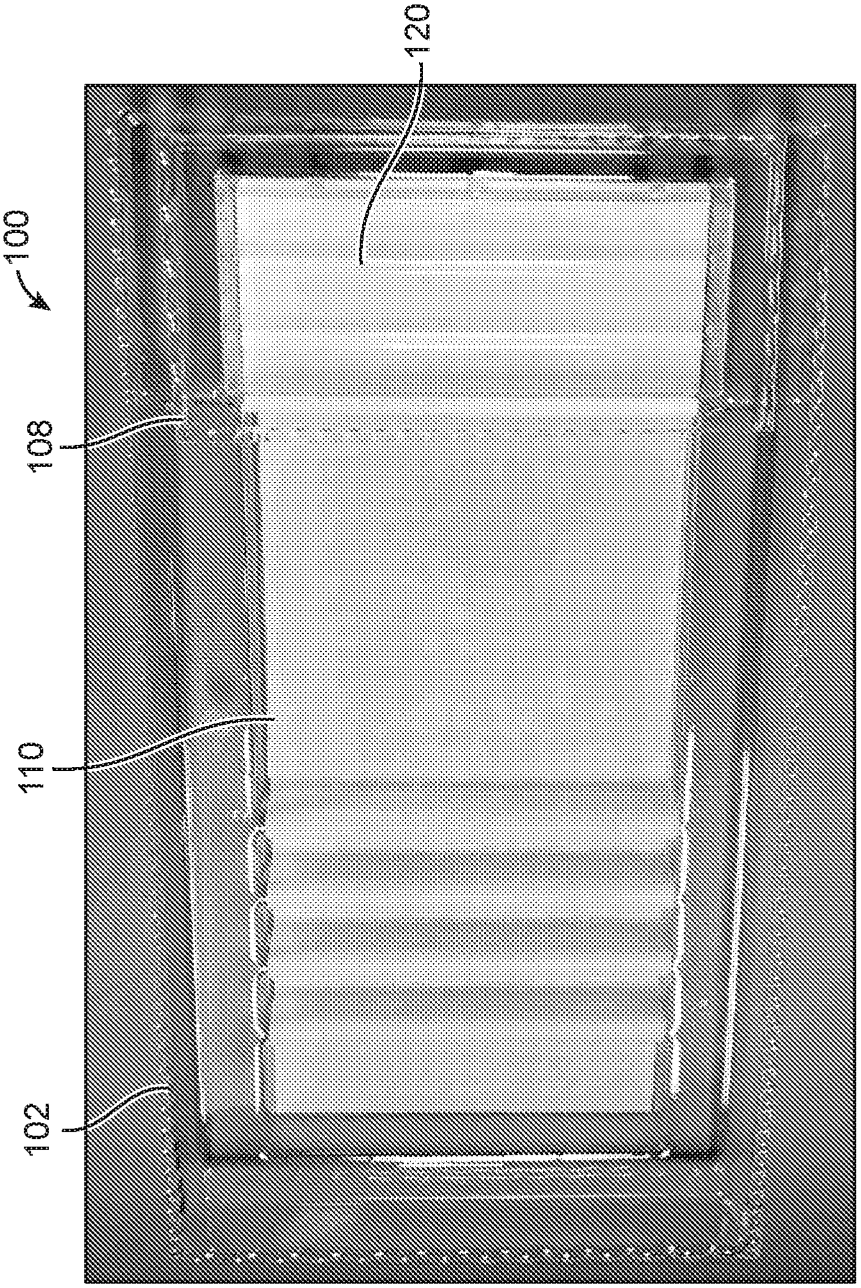
FIGS. 2A-2B are top and end views of a lateral flow device comprising a pump housing according to an embodiment of the invention.
Figure 2B:
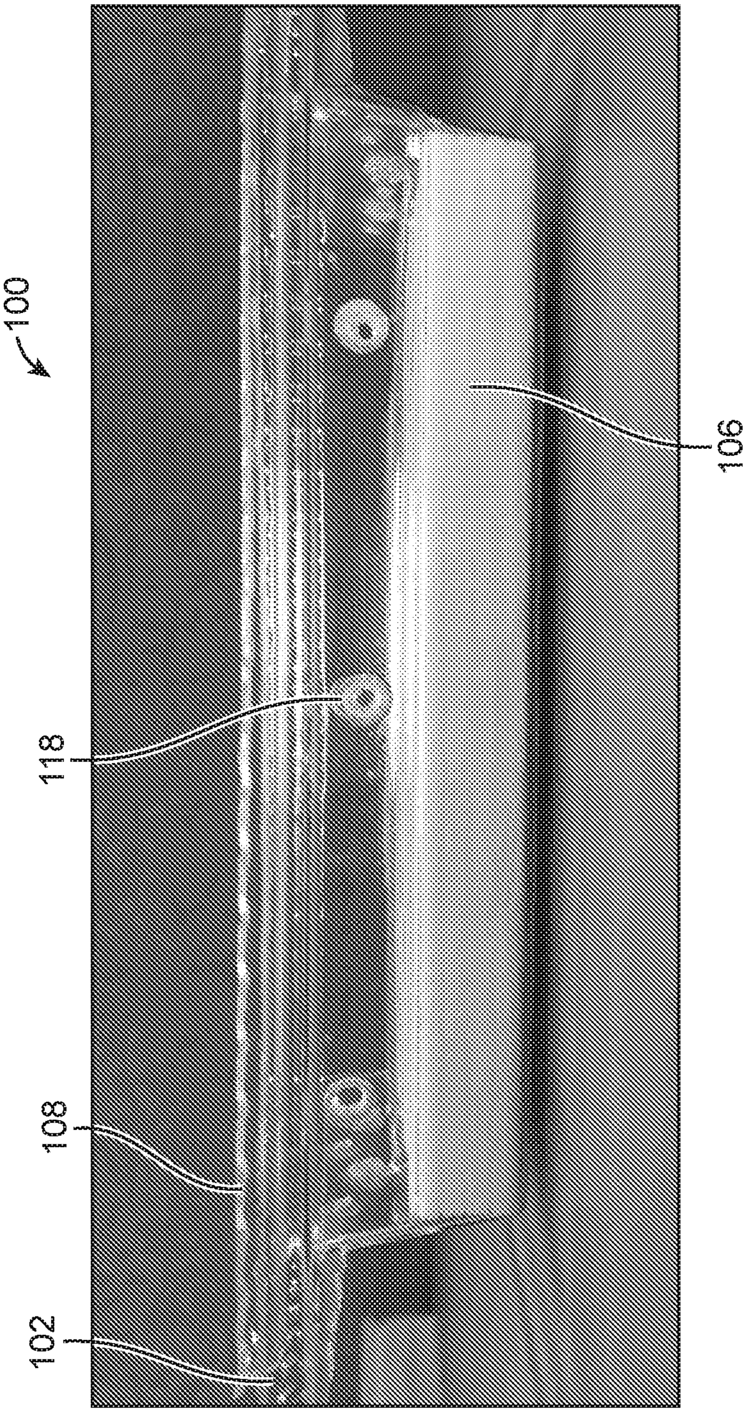

In some embodiments, the cup comprises a length and a width substantially the same as a respective length and width of the pump. The pump also generally has a similar width as the wicking pad. In certain embodiments, a bottom surface of the cup and/or the pump housing comprises a rib 120 to increase the rigidity of the bottom surface. In some cases, the rib is parallel to the longest dimension of the bottom surface of the cup and/or the pump housing (FIG. 2A). In certain embodiments, the cup and the base are formed from at least one plastic selected from the group consisting of polyethylene terephthalate, polyethylene terephthalate glycol modified, polypropylene, polystyrene, polyvinyl chloride, acrylic, polyester, and polycarbonate. In some embodiments, the cup and the base are formed by injection molding or a thermoforming process.

Referring to FIGS. 3A-5C, in an embodiment, the pump housing comprises a base 202, 302 comprising a region 204, 304 for placing a pump 206, 306 and a pump cover 208, 308. The pump 206, 306 comprises a compressible absorbent pad in contact with an end of a wicking pad 210, 310. The cover 208, 308 is attached to the base 202, 302 with spring loaded hooks 212, 312 that, for example, fit in respective holes 213, 313 in the base 202, 302. The cover 208, 308 exerts a downward force per unit area (or pressure) on the pump 206, 306. In some embodiments, the pressure exerted by the cover 208, 308 on the pump 206 is at least about 1000 Newtons per square meter. Alternatively, the force per unit area (or pressure) exerted by the cover on the pump can be between about 1000 Newtons per square meter and about 11,000 Newtons per square meter on the pump. In certain embodiments the force may be between about 1800 Newtons per square meter and about 5000 Newtons per square meter or between about 2200 Newtons per square meter and about 4400 Newtons per square meter. In yet other embodiments, the cover exerts: about 1800 Newtons per square meter; about 2200 Newtons per square meter; or about 4400 Newtons per square meter on the pump.

Figure 3A:
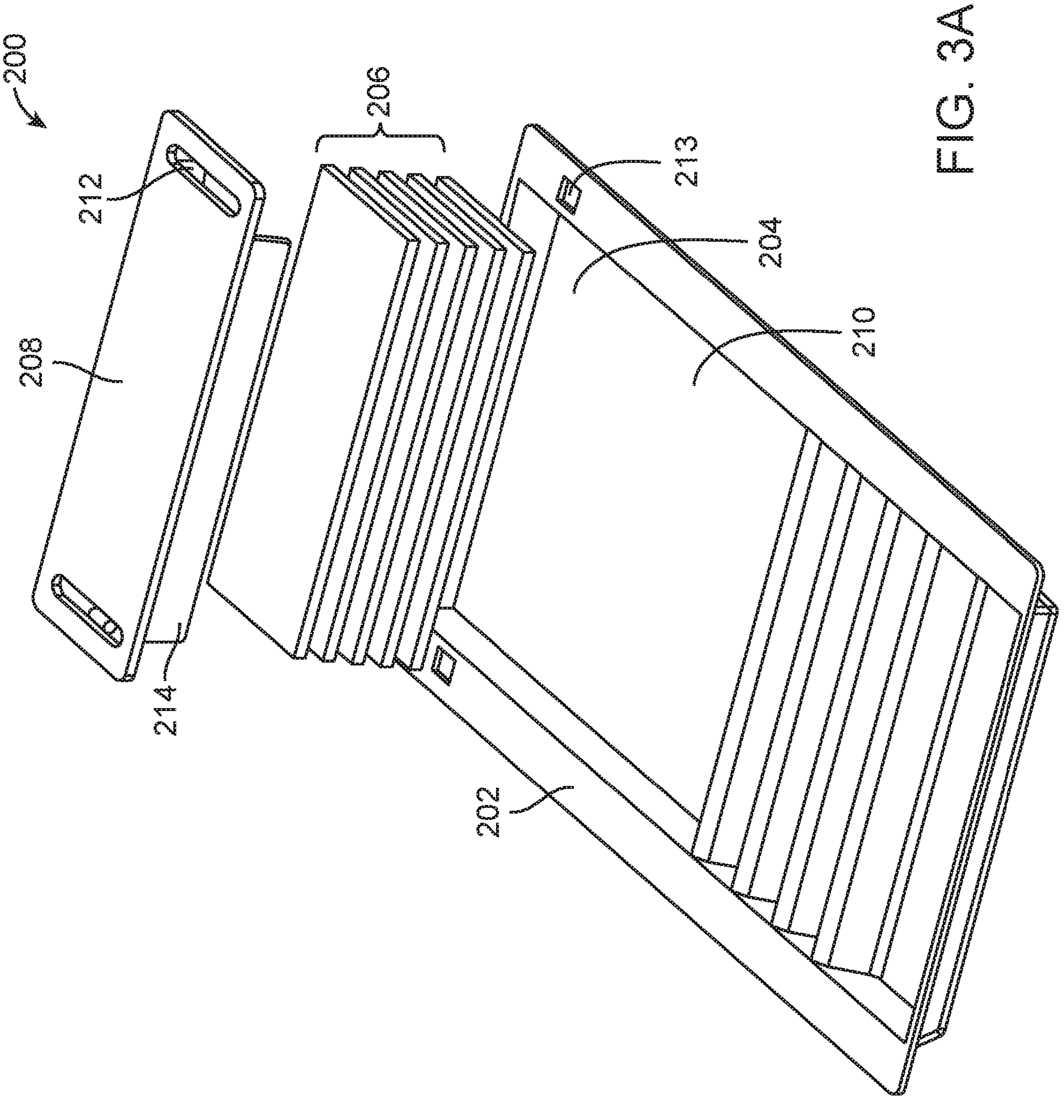
FIGS. 3A-3D are schematic views of a lateral flow device comprising a pump housing according to an embodiment of the invention.
Figure 3B:
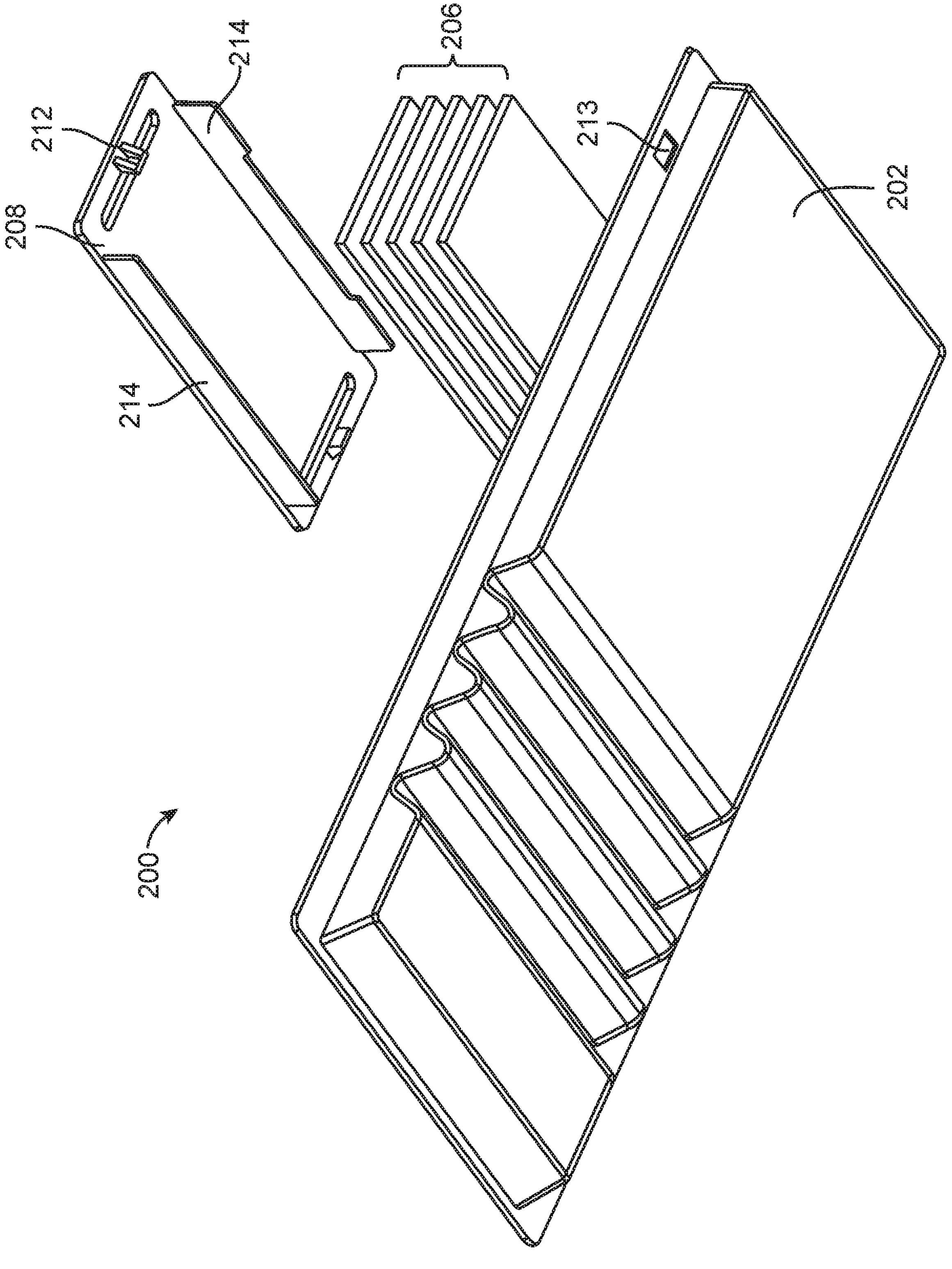
Figure 3C:
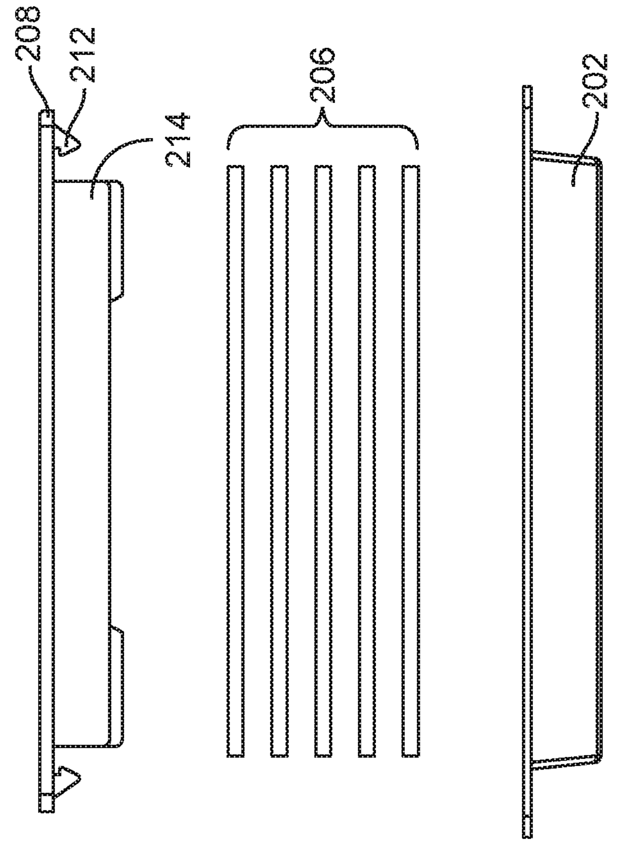
Figure 3D:
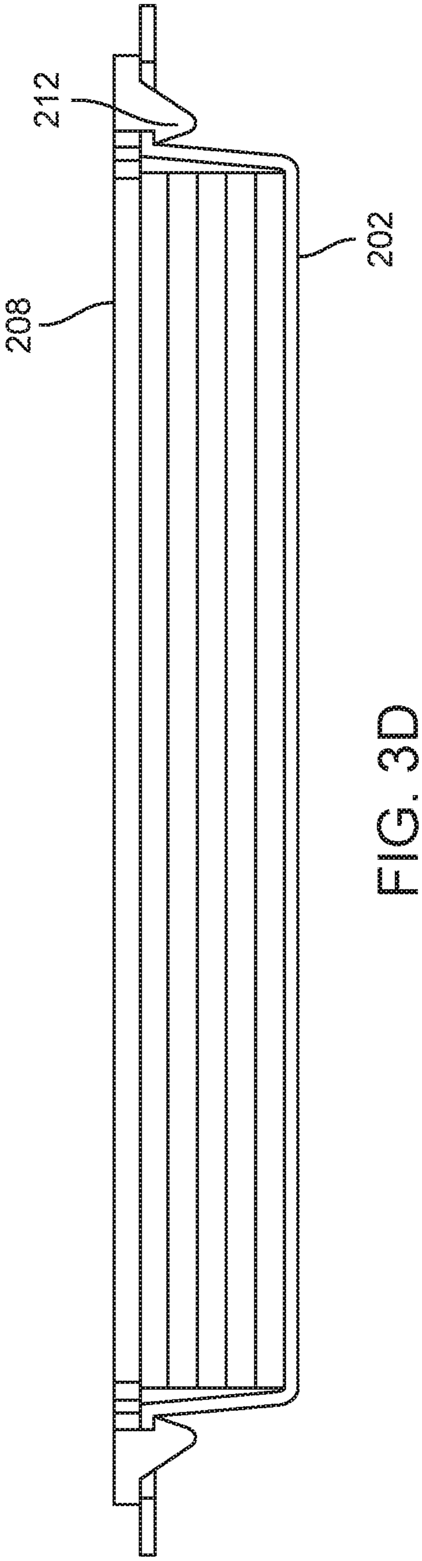
Figure 4:
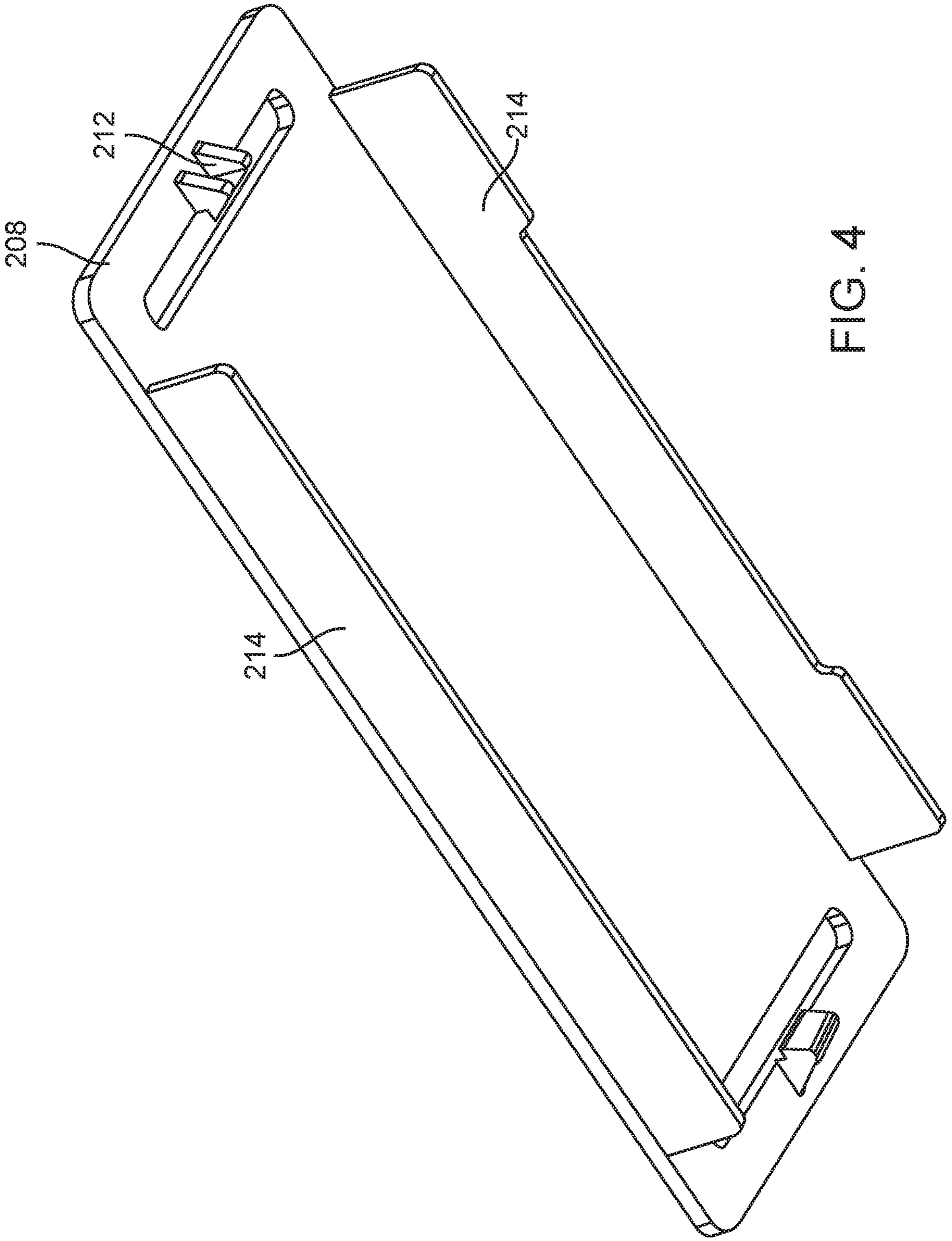
FIG. 4 is a schematic perspective bottom view a pump housing cover of the lateral flow device shown in FIGS. 3A-3D.
Figure 5A:
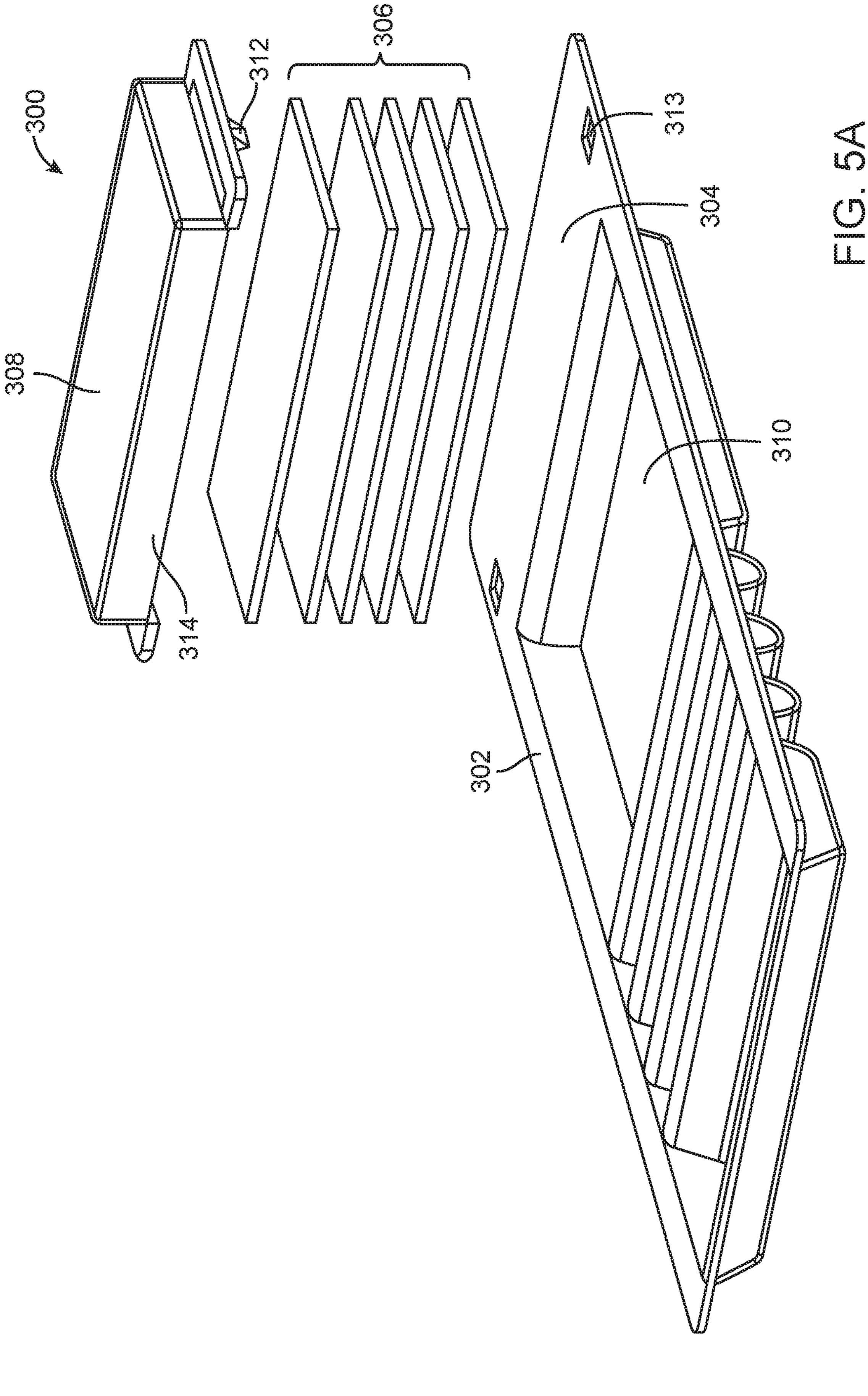
FIGS. 5A-5C are schematic views of a lateral flow device comprising a pump housing according to an embodiment of the invention.
Figure 5B:
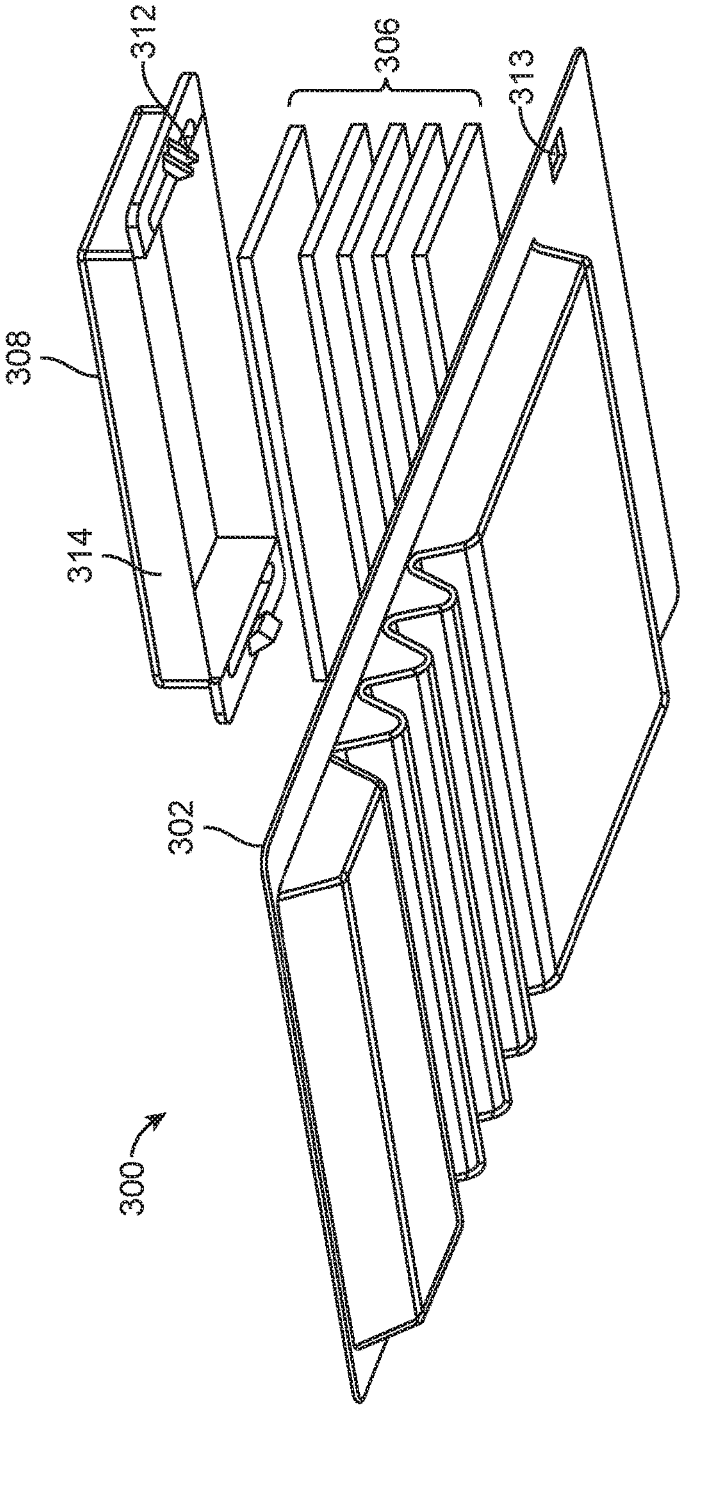
Figure 5C:
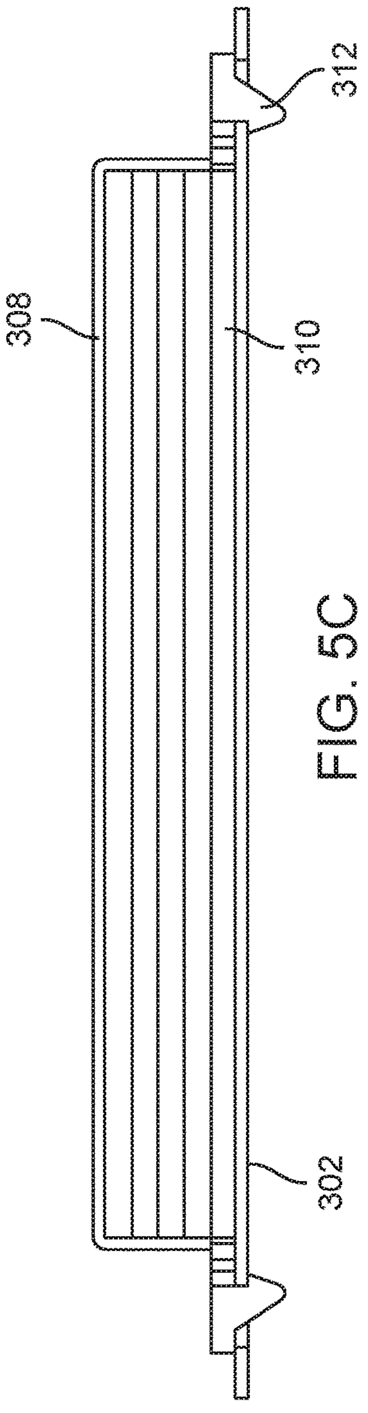

In some embodiments, the region 204 for placing the pump 206 is a cavity and the cover 208 is flat (FIGS. 3A-4). In certain embodiments, the region 304 for placing the pump 306 is flat and the pump cover 308 comprises a cavity for housing the pump 306 (FIGS. 5A-5C). In some cases, the cover 208 further comprises a retaining wall 214 for retaining the pump. In some embodiments, the cover further comprises two parallel retaining walls 214 running perpendicular to the lateral edges of the lateral flow device 200 (FIGS. 3A-4). In some embodiments, the cover and the base are formed from at least one plastic including, but not limited to, polyethylene terephthalate, polyethylene terephthalate glycol modified, polypropylene, polystyrene, polyvinyl chloride, acrylic, polyester, and polycarbonate. The cover and base can be formed by, for example, injection molding or by a thermoforming process.

In some embodiments, at least a part of the wicking pad 110, 210, 310 is bonded to the base 102, 202, 302.

The pump 106, 206, 306 and wicking pad 110, 210, 310 are generally formed of an absorbent or bibulous material and can be made out of, for example, natural fibers, synthetic fibers, glass fibers or blends thereof. Non-limiting examples include cotton, glass, and combinations thereof. There are many commercial materials available for diagnostic uses from vendors including, but not limited to, Ahlstrom, GE, PALL, Millipore, and Sartorius.

The bibulous material can include, but is not limited to, polymer containing material. The polymer can be in the form of polymer beads, a polymer membrane, or a polymer monolith. In some cases, the polymer is cellulose. Cellulose containing pads include paper, cloth, woven, or non-woven cellulose substrates. Cloth pads include those containing a natural cellulose fiber such as cotton or wool. Paper pads include those containing natural cellulose fiber (e.g., cellulose or regenerated cellulose) and those containing cellulose fiber derivatives including, but not limited to cellulose esters (e.g., nitrocellulose, cellulose acetate, cellulose triacetate, cellulose propionate, cellulose acetate propionate, cellulose acetate butyrate, and cellulose sulfate) and cellulose ethers (e.g., methylcellulose, ethylcellulose, ethyl methyl cellulose, hydroxyethyl cellulose, hydroxyethyl methyl cellulose, hydroxypropyl methyl cellulose, ethyl hydroxyethyl cellulose, and carboxymethyl cellulose). In some cases, the cellulose pads contains rayon. In some cases, the pad is paper, such as a variety of WHATMAN® paper.

The bibulous material can also include, but is not limited to, a sintered material. For example, the bibulous material can contain a sintered glass, a sintered polymer, or sintered metal, or a combination thereof. In some cases, the sintered material is formed by sintering one or more of powdered glass, powdered polymer, or powdered metal. In other cases, the sintered material is formed by sintering one or more of glass, metal, or polymer fibers. In still other cases, the sintered material is formed from the sintering of one or more of glass, polymer, or metal beads.

The bibulous material can also contain, but is not limited to, one or more non-cellulosic polymers, e.g. a synthetic polymer, a natural polymer, or a semisynthetic polymer. For example, the material can contain a polyester, such as polyglycolide, polylactic acid, polycaprolactone, polyethylene adipate, polyhydroxylalkanoate, polyhydroxybutyrate, poly(3-hydroxybutyrate-co-3-hydroxyvalerate, polyethylene terephthalate, polybutylene terephthalate, polytrimethylene terephthalate, polyethylene naphthalate, Vectran®. In some cases, the polymer is spunbound, such as a spunbound polyester.

Additional synthetic polymers include, but are not limited to nylon, polypropylene, polyethylene, polystyrene, divinylbenzene, polyvinyl, polyvinyl difluoride, high density polyvinyl difluoride, polyacrylamide, a ($C_2$-$C_6$) monoolefin polymer, a vinylaromatic polymer, a vinylaminoaromatic polymer, a vinylhalide polymer, a ($C_1$-$C_6$) alkyl (meth) acrylate polymer, a (meth)acrylamide polymer, a vinyl pyrrolidone polymer, a vinyl pyridine polymer, a ($C_1$-$C_6$) hydroxyalkyl (meth)acrylate polymer, a (meth)acrylic acid polymer, an acrylamidomethylpropylsulfonic acid polymer, an N-hydroxy-containing ($C_1$-$C_6$) alkyl(meth)acrylamide polymer, acrylonitrile or a mixture of any of the foregoing.

In some embodiments, the pump is configured to have a high solution capacity. In some cases, the high solution capacity is provided by having a pump with substantial height (e.g., thickness). In some cases, the pump is about 20, 15, 12, 11, 10, 9, 8, 7, 6, 5, 4, 3, 2, 1, 0.75, 0.5, or about 0.2 mm thick.

The pump generally has a large surface area due to the presence of a plurality of pores (i.e., the pump is porous). The large surface area can increase the loading capacity of the pump for one or more lateral flow solutions. In some embodiments, the pump has a specific surface area of at least about 0.001 $m^2/g$, 0.02 $m^2/g$, 0.1 $m^2/g$, 0.5 $m^2/g$, 1 $m^2/g$, 10 $m^2/g$, or more as measured by standard techniques.

In some embodiments, the pump and/or the wicking pad can have a particular pore size, a particular average pore size, or a particular pore size range. For example, the pump can contain 0.1 μm pores, 0.2 μm pores, 0.45 μm pores, or 1, 2, 4, 5, 6, 7, 8, 10, 15, 20 μm pores, or pores larger than about 20 μm. As another example, the pump can contain pores that average 0.1, 0.2, 0.45, 1, 2, 4, 5, 6, 7, 8, 10, 15, or 20 μm, or more in size. As another example, the pump can contain pores that range about 0.1-8 μm, 0.2-8 μm, 0.45-8 μm, 1-8 μm, 0.1-4 μm, 0.1-2 μm, 0.1-1 μm, 0.1-0.45 μm, 0.2-8 μm, 0.2-4 μm, 0.2-2 μm, 0.2-1 μm, 0.2-0.45 μm, 0.45-8 μm, 0.45-4 μm, 0.45-2 μm, 0.45-1 μm in size. In some cases, the pump can contain pores that are less than about 20 μm in size. For example, the pump can be composed of a material in which at least about 50%, 60%, 70%, 80%, 90% or more of the pores are less than about 20, 15, 10, or 5 μm in size. In some cases, the pores can be at least 1 nm in size, at least 5 nm in size, at least 10, 100, or 500 nm in size. Alternatively, at least 50%, 60%, 70%, 80%, 90% or more of the pores can be more than 1, 5, 10, 50, 100, or 500 nm in size. As used herein, pore size can be measured as a radius or a diameter. In some cases, the pump contains porous polyethylene, such as porous polyethylene having a pore size between 0.2 and 20 microns, or between 1 and 12 microns. The pump can have a different pore size in different regions of the pad. For example, the first sheet 150 can have a lateral flow region that has a different pore size or pore size range. In some embodiments, pore size is chosen to control flow rate. For example, a larger pore size will allow for a faster flow rate. In some cases, the wicking pad (e.g., glass fiber or cellulose) contains voids which can be defined by the size of particles retained by the material and/or flow rate (e.g., time it takes for water to flow 4 centimeters).

II. Methods

Provided are methods of making lateral flow device pump housings described herein.

In an embodiment, the method of making the pump housing comprises providing a pump, a base comprising a cavity for housing the pump, and a cup nested inside the cavity. The pump comprises a compressible absorbent pad in intimate contact with an end of a wicking pad.

The next step of the method comprises attaching a cup side wall to a pump housing side wall in the base while applying a pressure to the pump with the cup, thereby compressing the pump with the cup. The force per unit area (or pressure) can be adjusted depending on the application needs, desired flow characteristics, material compressibility, and absorptive capacity of the pump material. In some embodiments, the cup side wall is attached to the pump housing side wall by heat welding, adhesive bonding, solvent bonding, ultrasonication, or laser welding. Using this method, the pressure can be applied in a substantially uniform manner regardless of variations in pump material thickness. In some embodiments, the cup side wall is attached to the pump housing side wall with rivets or screws. In certain embodiments, the cup side wall is attached to the pump housing side wall by a complementary ratchet-like feature molded into the cup side wall and the pump housing side wall. The attaching locks the cup in a position that maintains the prescribed pressure on the pump once the external force has been removed.

In some embodiments having at least two reservoirs, the method of making the pump housing comprises providing at least two pumps, a base comprising at least two cavities for housing the pumps, and a cup nested inside each cavity. The pumps each comprise a compressible absorbent pad in intimate contact with an end of a wicking pad. The next step of the method comprises attaching each cup to the pump housing side wall in the base while applying a pressure to the respective pump with the cup, thereby compressing the pump with the cup.

In some embodiments, the method of making a lateral flow device pump housing comprises providing a pump, a base comprising a region for placing the pump, and a pump cover. The pump comprises an absorbent pad in intimate contact with an end of a wicking pad. The next step of the method comprises attaching spring loaded hooks in the cover to the base while applying a pressure to the pump with the cover, thereby compressing the pump with the cover.

In certain embodiments, the force per unit area (or pressure) applied by the cup or cover to the pump is at least about 1000 Newtons per square meter. Alternatively, method comprises applying a pressure of between about 1000 Newtons per square meter and about 11,000 Newtons per square meter on the pump with the cup or the cover. In certain other embodiments, the pressure applied by the cover or the cup in the disclosed method may be between about 1800 Newtons per square meter and about 5000 Newtons per square meter or between about 2200 Newtons per square meter and about 4400 Newtons per square meter. In yet other embodiments, the method comprises exerting a pressure of: about 1800 Newtons per square meter; about 2200 Newtons per square meter; or about 4400 Newtons per square meter on the pump with the cup or the cover.

All patents, patent applications, and other published reference materials cited in this specification are hereby incorporated herein by reference in their entirety.

What is claimed is:

1. A lateral flow device pump housing comprising:

a base comprising a cavity housing a pump, the pump comprising a compressed absorbent pad in contact with an end of a wicking pad; and a cup nested inside the cavity within the base, the cup being in contact with the pump and exerting a pressure of about 1000 Newtons per square meter to about 11,000 Newtons per square meter on the pump, wherein a cup side wall is attached to and directly contacts a pump housing side wall in the cavity, the cup side wall being attached to said pump housing side wall within the cavity by a heat weld.

2. The housing of claim 1, wherein the pressure is:

a) at least about 1000 Newtons per square meter;

b) between about 1800 Newtons per square meter and about 5000 Newtons per square meter;

c) between about 2200 Newtons per square meter and about 4400 Newtons per square meter;

d) about 1800 Newtons per square meter;

e) about 2200 Newtons per square meter; or f) about 4400 Newtons per square meter.

3. The housing of claim 1, wherein a bottom surface of the cup and/or the pump housing comprises a rib.

4. The housing of claim 3, wherein the rib is parallel to the longest dimension of the bottom surface of the cup and/or the pump housing.

5. The housing of claim 1, wherein the cup comprises a length and a width substantially the same as a respective length and width of the pump.

6. The housing of claim 1, wherein the cup and the base are formed from at least one plastic selected from the group consisting of polyethylene terephthalate, polyethylene terephthalate glycol modified, polypropylene, polystyrene, polyvinyl chloride, acrylic, polyester, and polycarbonate.

7. The housing of claim 1, wherein the cup has a bottom surface comprising a rib parallel to the longest dimension of the bottom surface of the cup.

8. The housing of claim 1, wherein the pump housing comprises a rib parallel to the longest dimension of the pump housing.

9. The housing of claim 1, wherein said housing comprises a reservoir in fluid communication with the end of the wicking pad opposite the pump such that the pump wicks lateral flow solution from the reservoir and the solution flows into the wicking pad and contacts substances immobilized on a substrate in contact with the wicking pad.

10. A lateral flow device comprising the housing of claim 1.

* * * * *